(12) United States Patent
Cochran et al.

(10) Patent No.: US 6,215,653 B1
(45) Date of Patent: Apr. 10, 2001

(54) MODULAR ELECTRICAL SUBSTATION AND METHOD OF CONSTRUCTING SAME

(75) Inventors: H. Stephen Cochran, Westerville; Henry G. Miller, Whitehall, both of OH (US)

(73) Assignee: AEP Resources Services Company

( * ) Notice: Subject to any disclaimer, the term of this patent is extended or adjusted under 35 U.S.C. 154(b) by 0 days.

(21) Appl. No.: 09/354,186

(22) Filed: Jul. 15, 1999

(51) Int. Cl.$^7$ ............................ H02B 1/00; H02B 5/00
(52) U.S. Cl. ............................................ 361/602; 361/603
(58) Field of Search ...................... 218/43–84, 154–157; 361/600–604, 605–624, 662–650; 211/117, 177, 189

(56) References Cited

U.S. PATENT DOCUMENTS

| | | | |
|---|---|---|---|
| 2,237,812 | 4/1941 | De Blieux | 361/603 |
| 2,551,841 | 6/1951 | Kepple et al. | 361/602 |
| 3,378,731 | 4/1968 | Whitehead | 361/603 |
| 3,474,396 | 10/1969 | Laurent | 439/689 |
| 3,556,310 | 1/1971 | Loukotsky | 211/189 |
| 3,864,534 | * 2/1975 | Goodwin, Jr. et al. | 218/43 |
| 3,887,821 | 6/1975 | Stipcevich | 307/112 |
| 4,053,724 | 10/1977 | Llona | 200/51 R |
| 4,092,547 | * 5/1978 | Ruppert | 307/113 |
| 4,342,067 | * 7/1982 | Thuries et al. | 361/603 |
| 4,360,849 | 11/1982 | Harris et al. | 361/39 |
| 4,367,512 | 1/1983 | Fujita | 361/625 |
| 4,491,897 | 1/1985 | Troebel | 361/636 |
| 4,562,360 | 12/1985 | Fujimoto | 307/149 |
| 4,651,255 | * 3/1987 | Suzayama et al. | 361/612 |
| 4,866,568 | 9/1989 | Eggebrecht et al. | 361/603 |
| 5,028,072 | * 7/1991 | Lindsay | 280/789 |
| 5,305,779 | * 4/1994 | Izaguirre | 137/172 |
| 5,535,102 | 7/1996 | Neill et al. | 361/832 |
| 5,578,792 | 11/1996 | Devonald, III et al. | 174/50 |
| 5,648,888 | 7/1997 | Le Francois et al. | 361/603 |
| 5,675,194 | 10/1997 | Domigan | 307/147 |

\* cited by examiner

Primary Examiner—J. R. Scott
(74) Attorney, Agent, or Firm—Sand & Sebolt

(57) ABSTRACT

A modular electrical substation for erection at a prepared site has a horizontal steel base formed of interconnected longitudinal and transverse beams and is set on the prepared site. An open top oil containment pan is centrally supported on the base and receives an electrical transformer therein. A pair of vertically extending frameworks formed of steel columns and connecting cross members are mounted on opposite ends of the base. One or more bays of circuit breakers and disconnect switches are supported on the base and frameworks. Incoming and outgoing conductors are dead ended on one or both of the frameworks which are connected by guy wires extending therebetween to distribute the conductor tension among the two frameworks. The central location of the transformer maintains the base in position on the prepared site avoiding the need for additional anchoring and/or foundations enabling the substation to be removable and reusable.

30 Claims, 8 Drawing Sheets

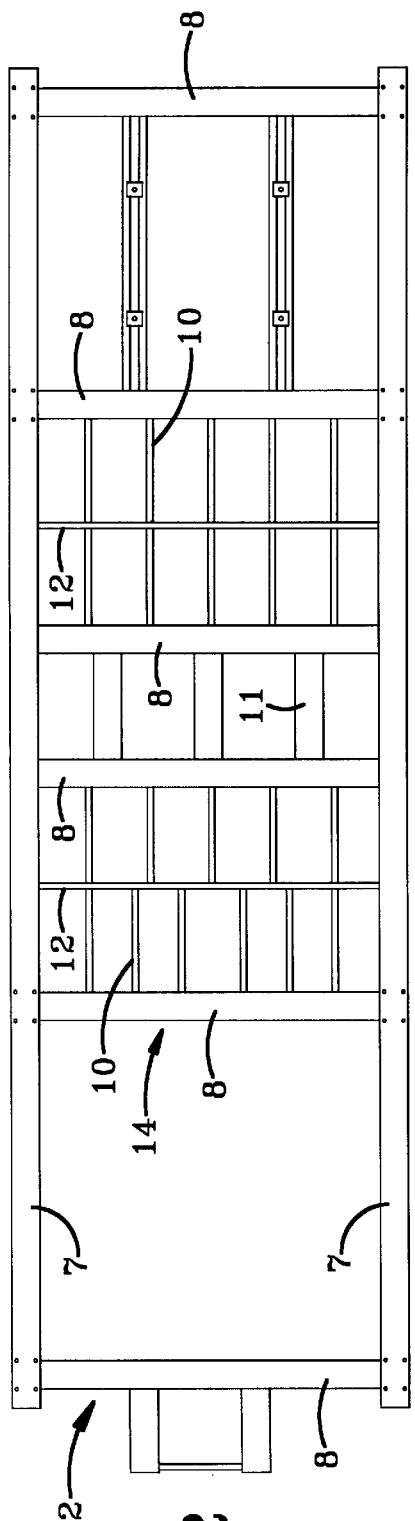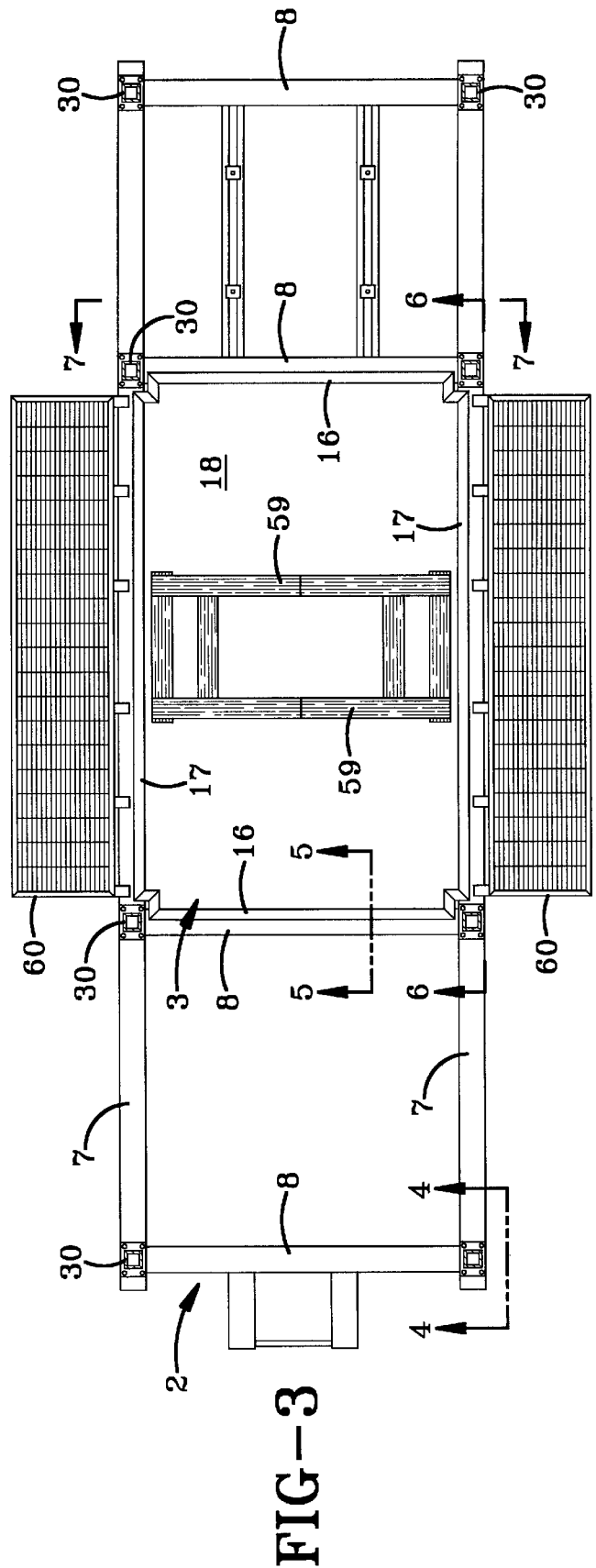

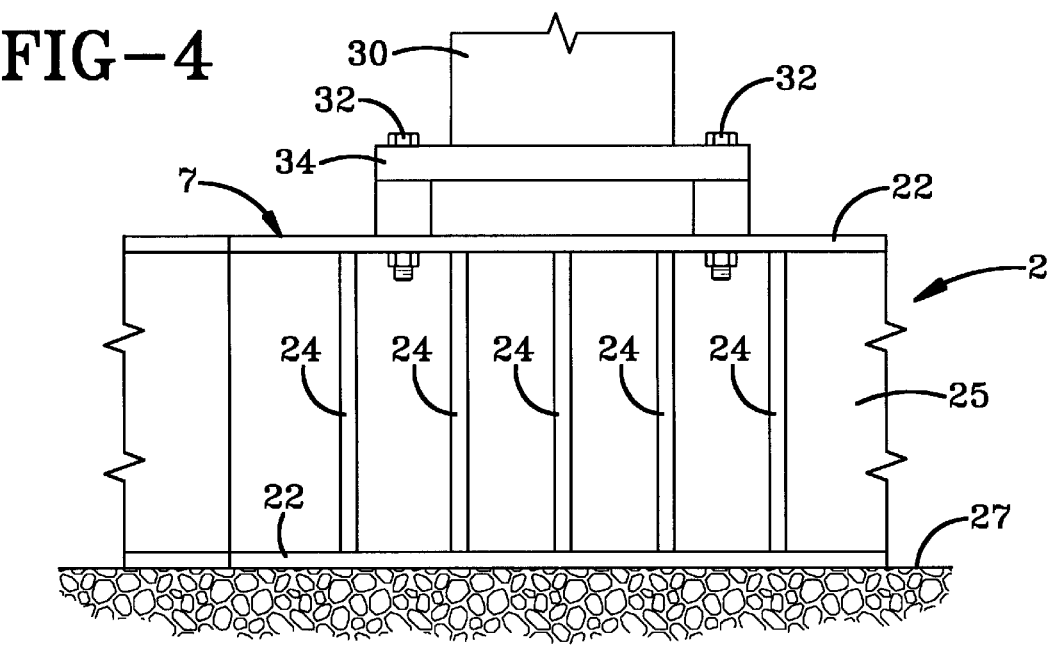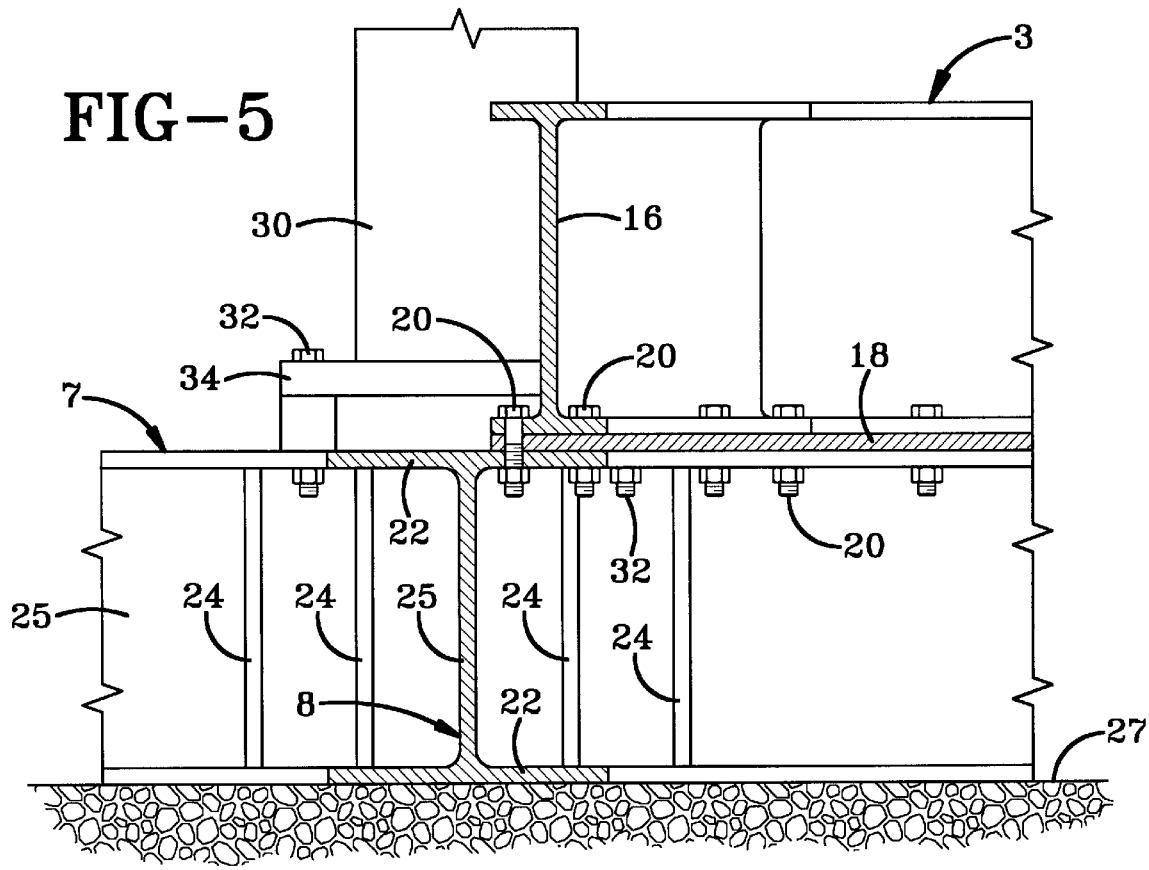

MODULAR ELECTRICAL SUBSTATION AND METHOD OF CONSTRUCTING SAME

BACKGROUND OF THE INVENTION

1. Technical Field

The invention relates to electric power distribution systems and in particular to substations and to the method of constructing the same. Even more particularly, the invention relates to a permanent but recoverable electrical substation which uses readily erectable and disassemble modules to reduce power substation construction costs and space capabilities than heretofore required by permanent substation constructions.

2. Background Information

Electric power substations have been utilized in the electrical utility industry and primarily in the transmission and distribution areas thereof for the supplying of electrical power for many years. These substations usually consist of a transformer which will receive a high incoming voltage and reduce the same to a lower voltage for ultimate use by a customer or for further distribution to a plurality of customers. These substations are constructed with permanent concrete bases and foundations on which the vertical frameworks are installed, and include concrete pads for mounting of the transformers and associated circuit breakers and control panels, etc. Once these substations are installed, they are intended to remain in place for a considerable number of years and require only occasional upgrading as to transformer sizes, insulators and associated circuit breakers and disconnect switches, should either the incoming or outgoing voltage increase or the transformers capacity size increase or decrease to meet a particular customer's needs or design criteria for the subsequent distribution and/or transmission system.

However, with the coming deregulation of the electric utility industry, it is becoming increasingly important that the substations be of a less permanent nature and of a reduced construction cost and erection time as well as reduction in the space occupied by the substation. The heretofore constructed substations with the concrete bases and transformer and circuit breaker pads are not removable without destroying these foundations and bases, all of which increase considerably the cost of modifying the station or removing the station should the customer desire a different electric power supplier. Likewise, the lower cost will become necessary in order to be more competitive in a competitive marketplace where a number of utilities will be vying for the same customer.

Various mobile substations have been developed such as shown in U.S. Pat. Nos. 2,237,812; 2,551,841; 4,367,512; and 4,562,360. In these substations, the various transformers, circuit breakers and associated equipment are mounted on a wheeled support truck or truck body and driven to a particular site. However, these mobile substations are for temporary use only and are used in the event of a power outage requiring replacement of a piece of major equipment within a substation, or are used during a substation rebuild. These mobile substations are not intended to remain at the substation site for any length of time and are limited as to their capability since they have to be transported by truck over public roads. Thus they are limited as to the weight able to be transported by the wheeled vehicle and the size and capacity of the equipment.

Therefore, the need exists for an improved electrical substation and to the method of constructing the same which enables a substation to be permanently constructed at a desired site at a reduced cost than heretofore possible, yet be easily removed from the site should the substation not be required, without material construction erection and/or subsequent destruction of foundations for supporting the various frameworks and electrical equipment used therein.

SUMMARY OF THE INVENTION

Objectives of the invention include providing an improved modular substation which has reduced construction costs and time as well as station space, than heretofore required by prior permanently constructed and assembled substations.

Another objective is to provide such an improved modular substation which provides for a permanent electrical facility, yet which enables all of the components to be easily recoverable from the site for subsequent reuse.

A still further objective of the invention is to provide such a modular substation which utilizes standard components to eliminate future engineering and design time and costs and which supports preassembled and prewiring of various components thereof, which can be performed at a site remote from the actual substation location.

Still another objective of the invention is to provide an electrical substation which eliminates the need of installation of below grade foundations requiring anchoring and concrete for forming of the framework foundations and pads for placement of the circuit breakers and transformers thereon.

A still further objective of the invention is to provide such a modular substation in which a main support base is formed of a plurality of readily available steel beams which can be assembled at a site remote from the ultimate site of the substation and transported to the site for placement thereon, or which can be assembled at the substation site by the use of readily available fasteners such as bolts and similar erection means.

Another objective of the invention is to provide such a modular electrical substation in which the frameworks for dead ending of incoming and outgoing conductors and for supporting the various insulators, disconnect switches, etc. can be either constructed off site and transported to the substation site or assembled in position at the substation site by bolting to the modular base without requiring any concrete foundations or any excavation for mounting the frameworks.

A still further objective of the invention is to provide such a modular substation in which an oil containment pan is centrally located on the base for receiving the transformer therein to guard against possible contamination of the surrounding soil should a transformer leak develop, and in which the transformer's central location on the base provides the needed weight to maintain the base in position and to counterbalance forces exerted on the base by the incoming and outgoing power lines.

Still another objective of the invention is to provide such a modular substation construction in which a pair of frameworks are provided on opposite sides of the transformer and are connected by guy wires so that the incoming and outgoing tensions of the power lines are distributed to both frameworks thereby reducing the amount of materials required in each of the individual frameworks, and in which the moment created on the base by the tension in the dead ended power lines is counterbalanced by the weight of the transformer and circuit breakers located on the base adjacent one or both of the frameworks.

These objectives and advantages are obtained by the modular electrical substation of the present invention, the general nature of which may be stated as including a base formed by a plurality of coplanar longitudinal and transverse connected beams, said base being adapted to rest upon a relatively horizontal level surface; oil containment means centrally located and supported on the base for receiving a transformer therein; and a pair of spaced frameworks containing a plurality of vertical members and connecting cross members attached to the base on opposite sides of the oil containment means for supporting disconnect switches, insulators and conductors which interconnect the transformer and said switches.

These objectives and advantages are further obtained by the method of the present invention forconstructing a modularelectrical substation, the general nature of which may be stated as including the steps of preparing a substantially level area for subsequent execution of the substation thereon; providing a base formed by a plurality of coplanar horizontal, longitudinal and transversely connected beams; placing the base on the prepared level area; mounting an oil containment pan on the base; securing a pair of vertically extending frameworks to the base on opposite ends of the oil containment pan; placing a transformer in the containment pan; mounting circuit breakers on the base adjacent at least one of the frameworks; mounting disconnect switches on said one framework; and installing conductors between thetransformerand circuit breakers, and between said circuit breakers and the disconnect switches.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 2 is a slightly enlarged plan view looking in the direction of arrows 2—2, FIG. 1;

FIG. 3 is a plan view looking in the direction of arrows 3—3, FIG. 1;

FIG. 4 is an enlarged fragmentary view looking in the direction of arrow 4—4, FIG. 3;

FIG. 5 is an enlarged fragmentary sectional view taken on line 5—5, FIG. 3;

Similar numerals refer to similar parts throughout the drawings.

DESCRIPTION OF THE PREFERRED EMBODIMENTS

Figure 1:
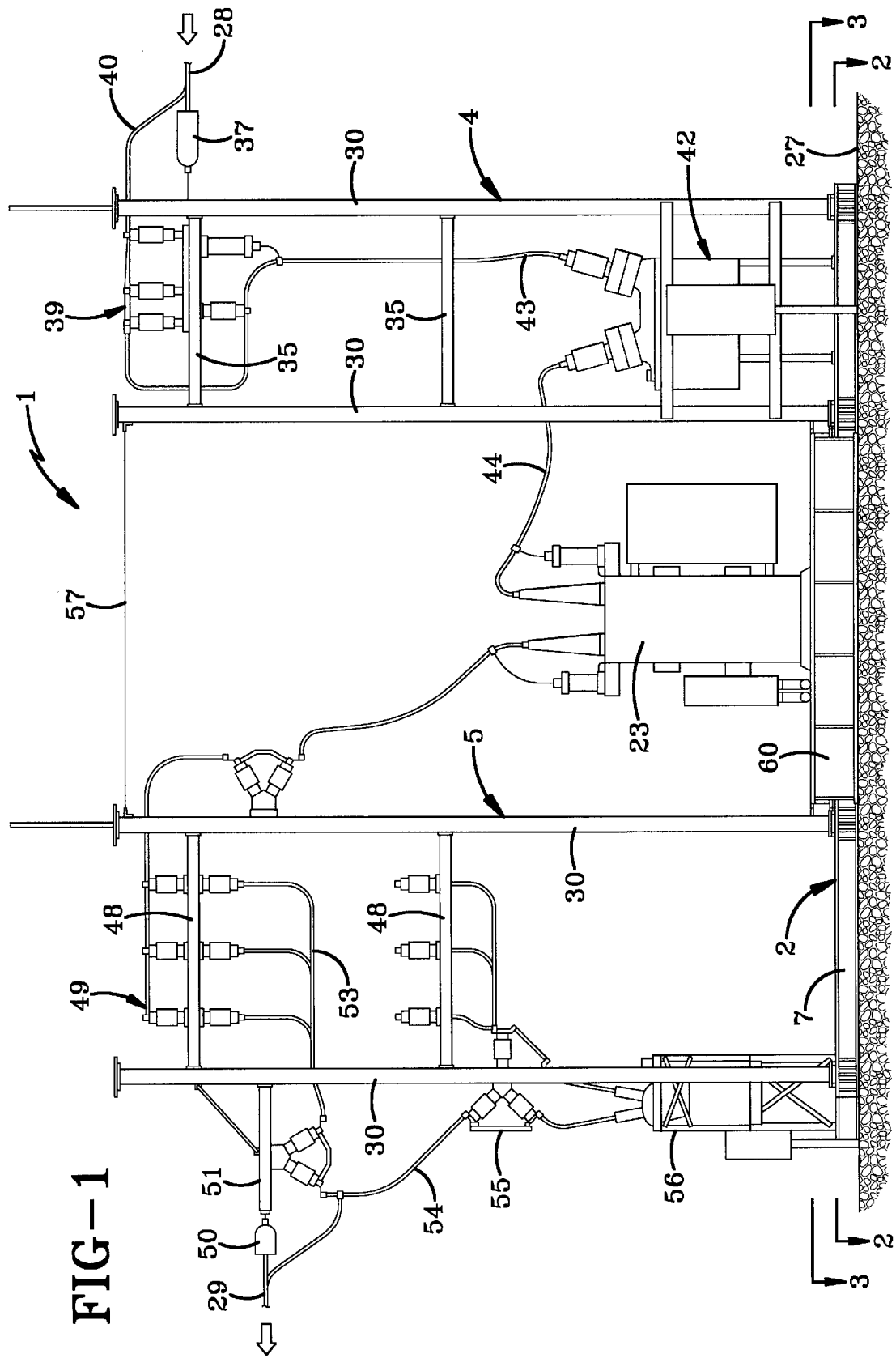
FIG. 1 is a diagrammatic elevational view of a first embodiment of the modular substation.

A first embodiment of the modular substation of the present invention is indicated generally at 1, and is shown particularly in FIG. 1. Substation 1 includes as its main components a base indicated generally at 2, shown particularly in FIGS. 2 and 3, a main oil containment pan 3 shown particularly in FIGS. 3, 6 and 7, a pair of frameworks mounted on opposite ends of base 2 and indicated generally at 4 and 5.

Base 1 (FIG. 2) includes a pair of spaced parallel longitudinally extending side beams 7 which are connected by a plurality of transversely extending cross beams 8, six of which are shown in the preferred embodiment. The four centermost cross beams 8 are connected by a grid work of smaller longitudinally extending members 10 and 11 and transversely extending members 12. Main beams 7 and 8 preferably are standard I-beams and preferably are connected to each other by bolts. However, otherfastening means such as welding, can be used without effecting the invention. However, bolts would be preferred since the same can be installed on site without requiring any mobile welding equipment and can be done by less skilled workers and at a reduced cost. Furthermore, the use of bolts enables the base to be disassembled and removed if desired as discussed below. The central portion of base 2 is indicated by 14, and is formed by the four transverse cross beams 8 and secondary transverse brace members 12 and secondary longitudinal beams 10 and 11 in order to provide a strong support for oil containment pan 3.

Pan 3 (FIGS. 3, 5, 6 and 7) may have various constructions than that shown in the drawings but preferably will consist of a pair of spaced parallel end walls 16 and spaced parallel sidewalls 17 which are connected to and mounted on a flat horizontal base 18 and together form an open top liquid receiving receptacle or chamber. The end and sidewalls 16 and 17 may also be formed out of standard I-beams as shown in FIG. 5, which may be secured to bottom wall 18 and to longitudinal and transverse support beams 7 and 8 by bolts 20 or other attachment means. Preferably, some type of sealant will be used between the side, end and bottom walls to prevent the leakage of any oil from within the pan.

As shown in FIGS. 2 and 3, the dimensions of pan 3 are generally complementary to those of the reinforced central area 14 as shown in FIG. 2 in order to be able to support the weight of a transformer 23 when placed within the open top or chamber of pan 3 and resting upon bottom wall 18. Furthermore, as shown in FIGS. 4 and 5, the outwardly extending flanges 22 of the various I-beams 8 and 9 preferably are reinforced by a plurality of vertically extending plates 24 which extend parallel to the webs 25 of the various I-beams to provide increased support for base 2 enabling it to support the massive weight of the transformer and other electrical equipment and frameworks described further below.

As can be seen particularly in FIGS. 1, 4 and 5, longitudinal side beams 7 in combination with beams 8, provide a horizontal support plane for supporting base 2 on a prepared site, which preferably has a layer of gravel 27 placed thereon to provide stability for the base. In accordance with one of features of the invention, no excavation is required such as for forming foundations or anchoring for base 2, since the base merely rests upon the prepared flat level surface on a layer of gravel 27. In further accordance with the invention, base 2 can be erected completely off site and transported to the substation site and placed on gravel bed 27 or can be brought to the construction site in individual components and erected relatively easy by bolting together the various beams, which preferably are predrilled. Pan 3 also can be assembled off site and then bolted to the top flanges of the beams in central reinforced area 14 and to side and end walls 16 and 17.

The particular construction of frameworks 4 and 5 will depend upon the particular use of the substation in the transmission and/or distribution system, the voltage of the incoming and outgoing lines, and if part of the utilities system or if located at a customer's site. The embodiment of substation 1 shown in FIG. 1, is a typical stepdown substation site wherein the incoming line 28 has a high voltage, for example 138 kv, 69 kv etc., and the outgoing line 29 has a voltage, for example, of 46/34.5 Y/19.9 kv. Framework 4 is formed by a plurality (preferably four) main vertical columns 30, which preferably are standard I-beams or tubular steel. Columns 30 are bolted to base beam 7 at a junction with cross beams 8 as shown in FIGS. 3 and 4, by a plurality of bolts 32. This location will have a plurality of vertically extending reinforcing plates 24 which, as discussed above, extend between I-beam flanges 22 to provide sufficient strength for supporting vertical columns 30. Columns 30 will have some type of mounting base 34 for attachment to top flange 22 of beam 7 as shown in FIG. 4.

A plurality of horizontally extending cross beams 35, only two of which are shown in FIG. 1, will extend between columns 30 to form a box-like framework. Dead end insulator strings 37 will be connected to a cross beam similar to cross beam 35 (not shown), extending between the front two columns 30 for dead ending incoming conductors 28. A series of usual disconnect switches 39 will be mounted on upper cross beams 35 or a platform extending therebetween, and will be connected to incoming conductors 38 by conductors 40 and to a bank of oil circuit breakers 42 by conductors 43. Another series of conductors 44 will extend between the high voltage side of transformer 23 and circuit breakers 42.

Frameworks 5 in the embodiment shown in FIG. 1, is generally similar to that of framework 4 and preferably consists of four vertically extending columns 30 which again preferably will be I-beams or tubular steel and are folded to base 2 on longitudinal beams 7 at the junction with cross beams 8 (FIG. 3) in a similar manner as shown in FIG. 4 and discussed above. A plurality of cross beams 48, only two of which are shown in FIG. 1, will extend between the front two columns 30 and the rear columns 30 with the topmost cross beam 48 supporting a set of disconnect switches 49. The three phase outgoing line 29 is connected to the outer vertical columns 30 by insulator strings 50 and attachment beams 51 or other type of dead ending support and are connected by conductors 53 to disconnect switches 49 and by conductors 54 to another set of disconnect switches 55 and a bay of oil circuit breakers 56.

The particular mounting arrangement of the various circuit breakers, disconnect switches, insulators, lightning arresters can vary from that shown in the drawings without affecting the concept of the present invention. The main feature is that frameworks 4 and 5 are mounted preferably on the ends of base 2 on opposite side of transformer 23. The weight of transformer 23 provides the ballast for maintaining base 2 in position and for counterbalancing any moment exerted thereon by the dead ending of incoming and outgoing lines 28 and 29 respectively. Furthermore, the mounting of circuit breakers 42 and 56 on base 2 adjacent the ends thereof also function as ballast to maintain base 2 in position and to counterbalance any moment placed on frameworks 4 and 5 by the dead ended conductors. Furthermore, a plurality of guy wires 57 will extend between the innermost columns 30 in order to distribute the dead end tensions of lines 28 and 29 to both of the frameworks. Thus one of the frameworks need not be substantially larger than the other even though the conductors which are dead ended thereto have a greater stringing tension than that of the other conductors.

Upon reviewing FIG. 1, it is readily seen that base 2 will provide a movable and readily erectable base or foundation for all of the substation components and that the mounting of the transformer 23, which is the heaviest piece of equipment used therein, in the central area of the base in combination with the two sets of oil circuit breakers located on opposite sides thereof and at the ends of the base, will provide sufficient weight and counterbalances to counteract any moment forces exerted on the base by the incoming and outgoing dead ended conductors secured to frameworks 4 and 5. Again, base 2 and frameworks 4 and 5 including pan 3, are readily assembled either on site or can be brought partially assembled to the substation site and then erected into the final configuration desired.

Figure 6:
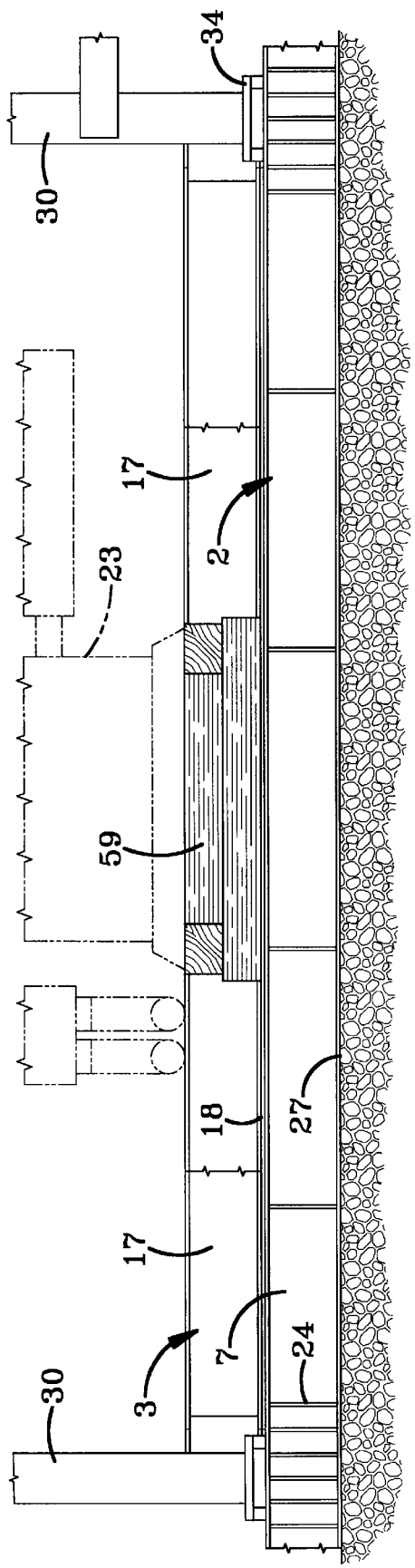
FIG. 6 is an enlarged fragmentary sectional view taken on line 6—6, FIG. 3.
Figure 7:
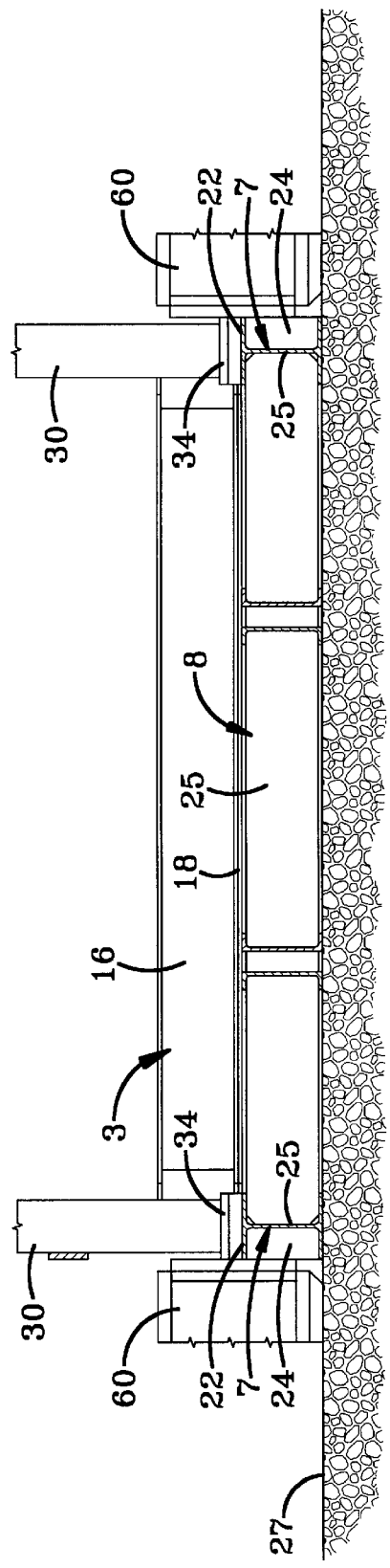
FIG. 7 is an enlarged fragmentary sectional view taken on line 7—7, FIG. 3.

A plurality of wood beams 59 such as railroad cross ties, are arranged in a stacked relationship on bottom wall 18 of pan 3 as shown in FIGS. 3 and 6 for supporting of transformer 23 thereon. This will raise the base of the transformer above bottom wall 18 and out of contact with any fluid collected therein such as leaking oil, rain water or the like. One or more auxiliary oil containment tanks 60 are mounted adjacent base 2 as shown in FIG. 3 and are in fluid communication with pan 3 for collecting any oil leaking from transformer 23 into pan 3.

Figure 8:
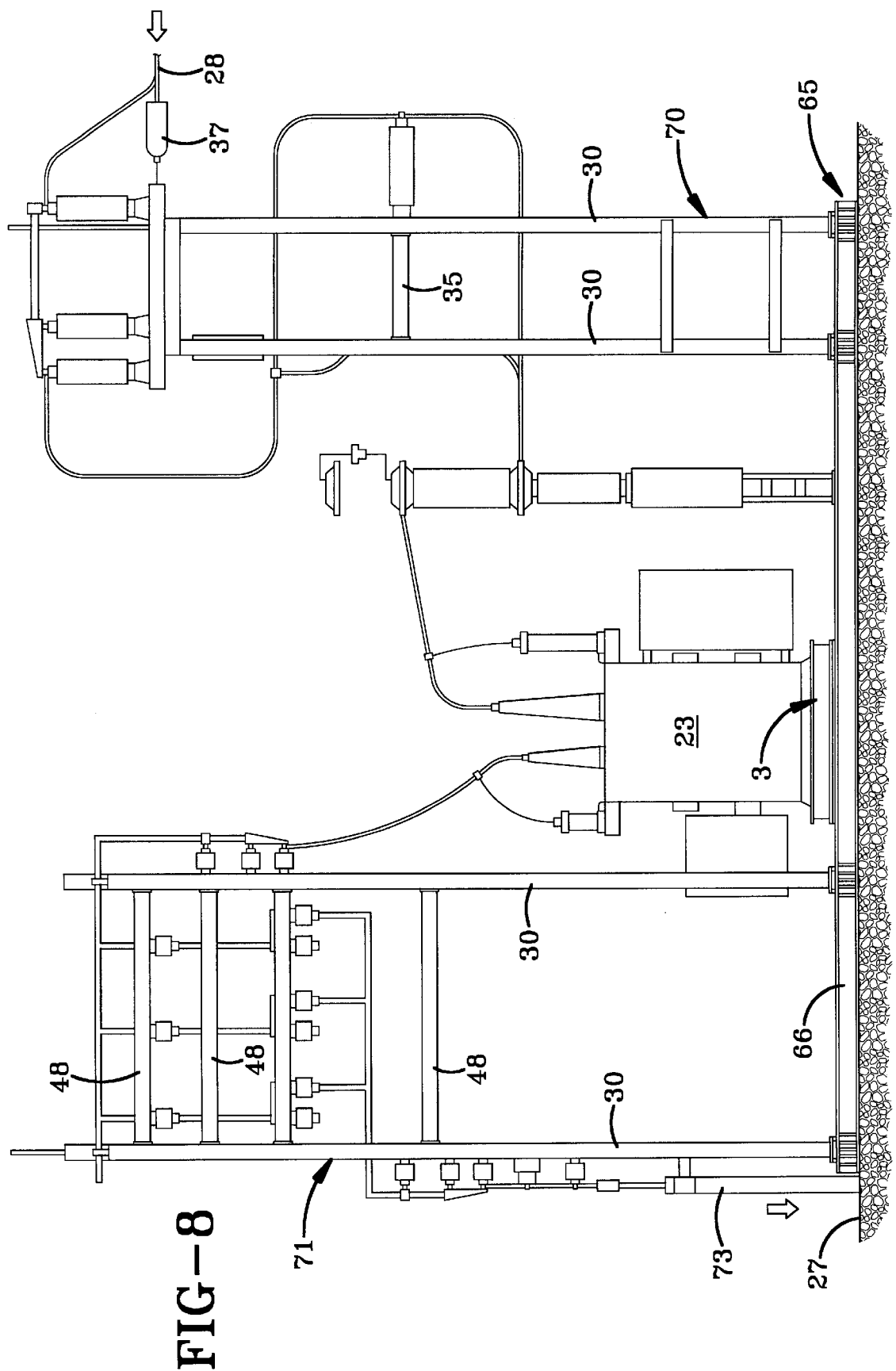
FIG. 8 is a diagrammatic elevational view similar to FIG. 1 of a modified modular substation.
Figure 9:
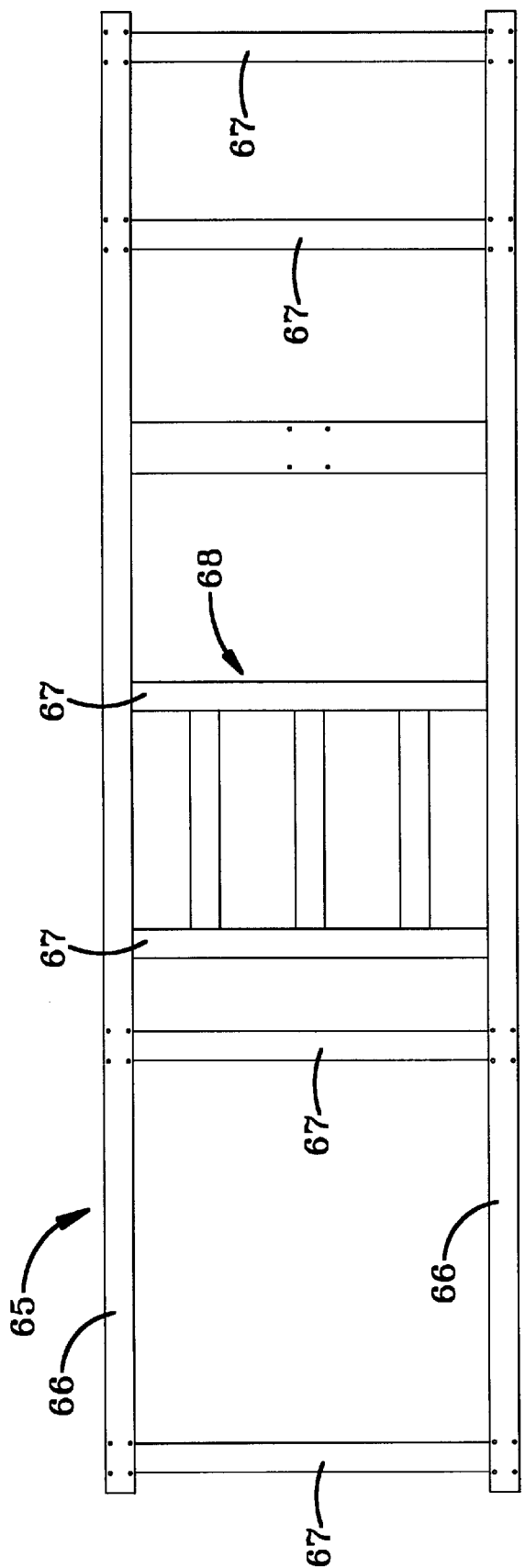
FIG. 9 is a top plan view of the base for the substation of FIG. 8.

A second embodiment of the invention is shown in FIGS. 8 and 9 and includes a slightly modified base 65. Base 65 includes a pair of longitudinally extending I-beams 66 and a plurality of transverse cross beams 67 with a reinforced central area 68. Base 65 supports the configuration of electrical components shown in FIG. 8 and which has a pair of frameworks 70 and 71 which are similar to frameworks 4 and 5 of substation 1. The main difference between the embodiment shown in FIG. 8 and that shown in FIG. 1 is that there is no outgoing conductors similar to conductors 29. Instead, the low voltage side of transformer 23 is connected to an underground exit 73 after passing through the various disconnect switches shown mounted on framework 71. In the substation design of FIG. 8, transformer 23 provides the main ballast to base 65 which again will be within oil containment pan 3 and will counteract the dead end forces exerted by conductors 28 on framework 70. The other components shown in FIG. 8 are standard insulators, lightning arresters and disconnect switches as discussed above with respect to substation 1 and therefore are not described in greater detail. Again, the individual columns 30 are bolted to longitudinal beams 66 at the junction with cross beams 67 in a similar fashion as shown in FIG. 4 and discussed above including the reinforcement of beams 66 by the use of reinforcing plates 24.

Figure 10:
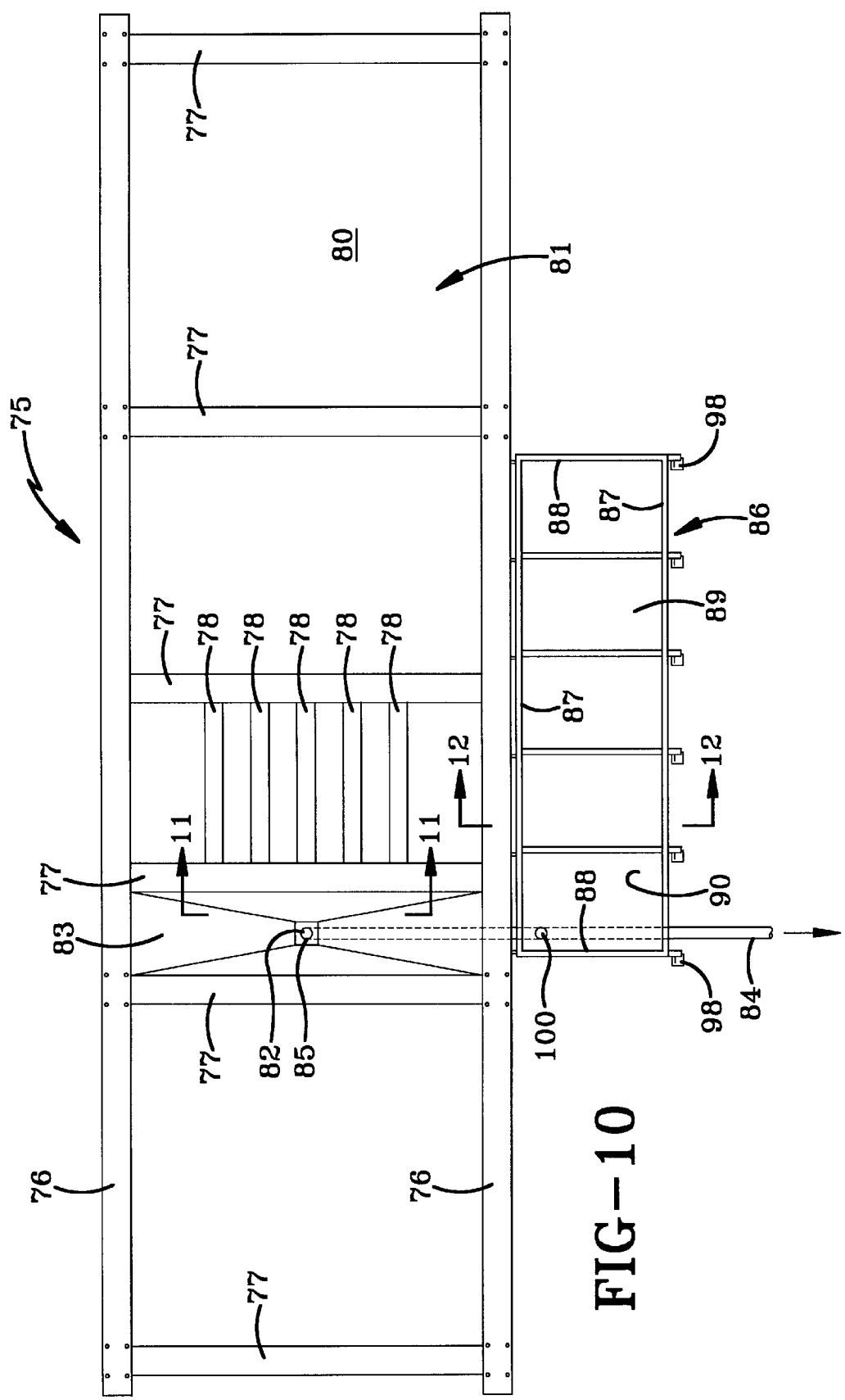
FIG. 10 is a top plan view of a modified modular substation base.
Figure 11:
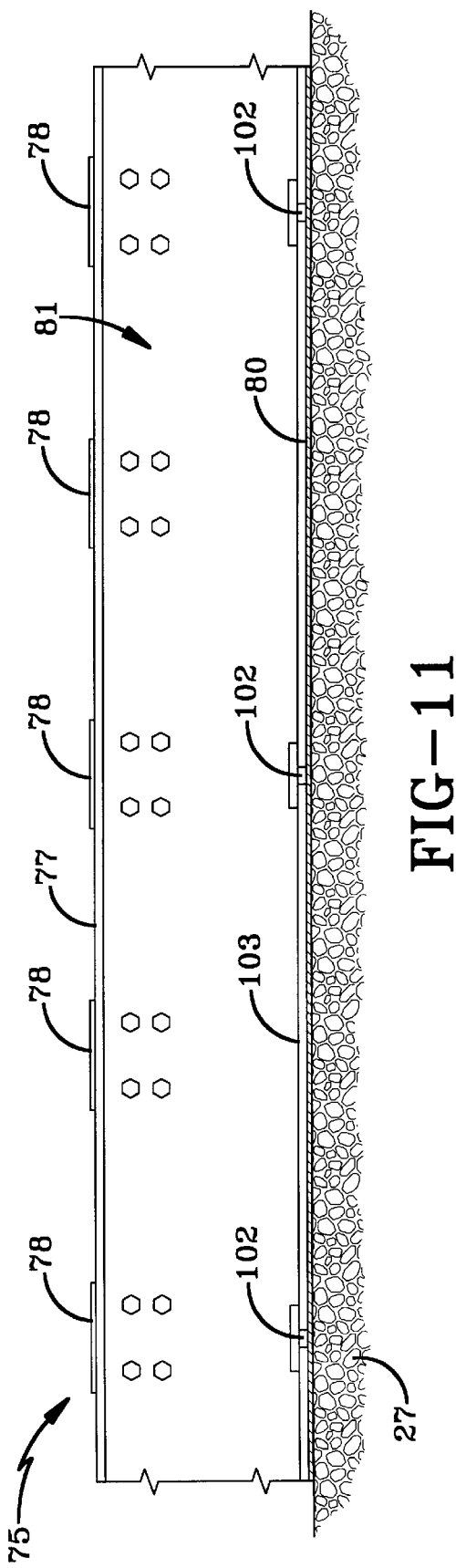
FIG. 11 is an enlarged fragmentary sectional view taken on line 11—11, FIG. 10.
Figure 12:
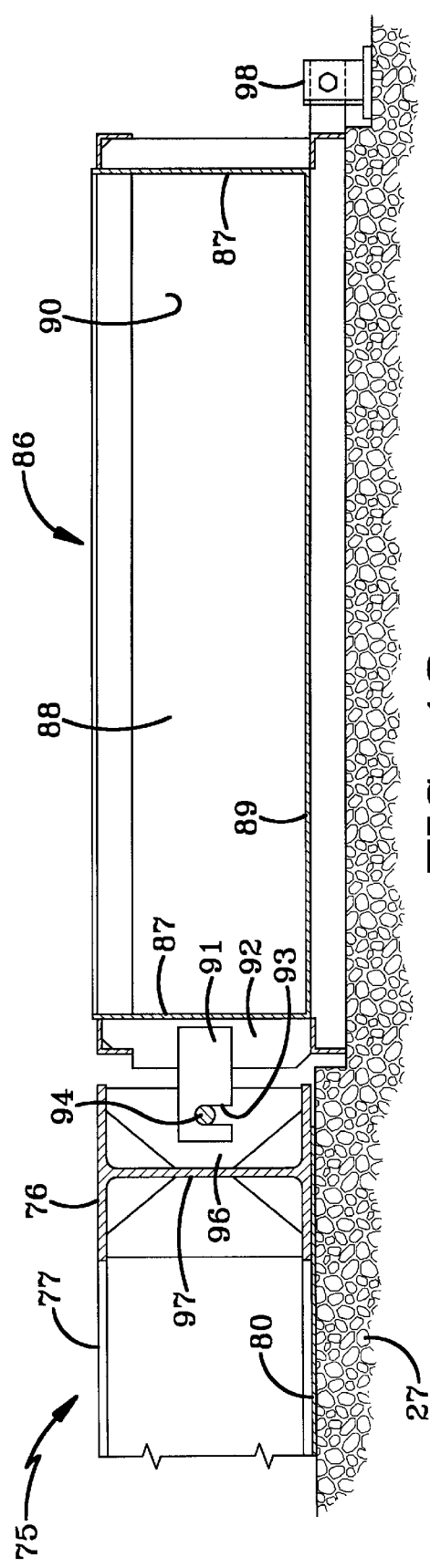
FIG. 12 is an enlarged fragmentary sectional view taken on line 12—12, FIG. 10.

Another embodiment of a base for the modular substation of the present invention is shown in FIGS. 10, 11 and 12 and indicated generally at 75. Base 75 is formed by a pair of longitudinally extending side beams 76 and a plurality of transversely extending cross beams 77. A plurality of reinforcing beams 78 extend between the innermost two cross beams 77 to provide a supporting platform on which a transformer will be subsequently mounted. Base 75 has a solid base plate 80 which preferably extends completely between the two end cross beams 77 and longitudinal beams 76, and together form an oil containment pan 81. Various sealing materials (not shown) would be applied at the junction of base sheet 80 and beams 77 and 76 to form a liquid tight container or chamber within pan 81, the height of which would be that of beams 76 and 77.

A drain opening 82 is formed in base plate 80, preferably having a tapered area 83 leading thereto whereby any collected oil and water will flow through drain opening 82 and into an outlet pipe 84. An oil/water separator valve 85 is mounted at drain opening 82 whereby only water is permitted to flow into outlet pipe 84 for subsequent drainage into a manhole or ditch with the oil remaining in chamber of containment pan 81.

Certain types of transformers will have radiator cooling compartments containing a large volume of oil which extend outwardly beyond the transformer, and in certain applications will extend beyond the perimeter of the main transformer oil containment pan. In those installations, an auxiliary oil containment pan is utilized, such as designated at 60 and shown in FIG. 3. In the modified base of FIGS. 10–12, an auxiliary oil containment pan 86 is mounted adjacent to one or both sides of base 75 and will be located beneath the transformer cooling fan compartments. Auxiliary pan 86 is formed by a pair of longitudinally extending side plates 87, a plurality of cross plates 88 and a bottom wall or plate 89 which forms an oil containment chamber 90 therebetween. A preferred manner of mounting auxiliary pan 86 is by the use of a hanger mounting plate or bracket 91 (FIG. 12) which is secured to a plate 92 welded to longitudinal plate 87. Plate 91 has a U-shaped notch 93 formed in an outer end thereof which receives a mounting pin 94 which is welded on and extends outwardly from a mounting bracket 96 secured to the web 97 of longitudinal beam 76. This provides a pivoting pin and notch mounting connection. The opposite end of auxiliary containment pan 86 has a support bracket 98 which rests upon the previously prepared gravel site whereby the auxiliary containment pan is in a level position generally horizontally aligned with the main oil containment pan 81. A drain opening 100 (FIG. 10) is formed in bottom wall 89 of containment pan 86 and will be provided with the appropriate check valve for permitting only the flow of water therethrough into outlet pipe 84.

As shown in FIG. 11, a plurality of drain holes 102 are formed in the bottom beam flange 103 of cross beams 77 of base 75 enabling any trapped oil to flow throughout the length of oil containment pan 81.

The modular concept of the invention enables the size and configuration of bases 2, 65 and 75 to be easily modified by adding or subtracting beams of various sizes to different locations on the base to accept various sizes and types of electrical components. Also, the base or portions thereof can be prewired and assembled at a remote site with control cabinets etc. for subsequent connection to the circuit breakers, transformers etc. saving erection time at the job site.

Most importantly, the invention provides a permanent but recoverable facility, reduces construction costs, eliminates re-engineering and design costs, reduces substation size by using the unitized steel base and modules, and allows preassemble and pre-wiring of the base and modules.

Accordingly, the improved modular electrical substation and method of constructing same is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved modular electrical substation and method of constructing same is construed and used, the characteristics of the construction, and the advantageous, new and useful results obtained; the new and useful structures, devices, elements, arrangements, parts and combinations, are set forth in the appended claims.

What is claimed is:

1. A modular electrical substation including:
    a base formed by a plurality of coplanar longitudinal and transverse connected beams, said base resting upon a relatively horizontal level surface;
    a pair of spaced frameworks containing a plurality of vertical members and connecting cross members attached to the base, said pair of spaced frameworks supporting disconnect switches, insulators and conductors which interconnect a transformer and said switches; and
    an oil containment pan forming a liquid containment chamber for receivably supporting a transformer therein to collect any oil which may leak from said transformer, said pan being mounted on the base between the spaced frameworks.

2. The modular substation defined in claim 1 wherein one of said frameworks includes a plurality of clamps for dead ending a plurality of incoming high voltage conductors.

3. The modular substation defined in claim 2 including guy wires extending between the spaced frameworks for distributing the forces exerted on said one frameworks by the incoming conductors to the other framework.

4. The modular substation defined in claim 2 including a plurality of circuit breakers mounted on the base adjacent said one framework and conductors extending between said circuit breakers and the disconnect switches.

5. The modular substation defined in claim 4 including a second plurality of circuit breakers mounted on the base adjacent the other of said frameworks.

6. The modular substation defined in claim 5 including a transformer and conductors extending between the transformer and the circuit breakers.

7. The modular substation defined in claim 1 in which the oil containment pan has a bottom wall and upstanding sidewalls forming the liquid containment chamber therebetween.

8. The modular substation defined in claim 7 including a plurality of wood beams supported on the bottom wall of the oil containment pan for subsequently supporting a transfromer thereon.

9. The modular substation defined in claim 1 in which an auxiliary oil containment pan is mounted adiacent the liquid containment chamber and is in fluid communication therewith.

10. The modular substation defined in claim 1 including an auxiliary oil containment pan mounted on one of the longitudinal beams and extending outwardly from the base.

11. The modular substation defined in claim 10 in which the auxiliary oil containment pan includes a plurality of hanger brackets extending outwardly from a side plate of said auxliary oil containment pan and operatively connected to said one longitudinal beam of the base.

12. The modular substation defined in claim 11 in which the hanger bracket is pivotally connected to said one longitudinal beam by a pin and notch connection.

13. The modular substation defined in claim 1 in which the base includes a bottom plate mounted beneath and to the longitudinal and transverse beams and forming the generally liquid tight oil containment chamber therewith.

14. The modular substation defined in claim 13 including a drain opening formed in the bottom plate for removing liquid from the oil containment chamber.

15. The modular substation defined in claim 14 including an oil/water separation valve in fluid communication with the drain opening preventing the flow of oil through said drain opening.

16. A method of constructing a modular electrical substation including the step of:

preparing a substantially level area for subsequent erection of the substation thereon;

providing a base formed by a plurality of coplanar horizontal, longitudinal and transversely connected beams;

placing the base on the prepared level area;

securing a pair of vertically extending frameworks to the base adjacent opposite ends of the base;

placing a transformer in a central area of the base between the frameworks;

mounting circuit breakers on the base adjacent at least one of the frameworks;

mounting disconnect switches on said one framework; and installing conductors between the transformer and circuit breakers, and between said circuit breakers and the disconnect switches.

17. The method defined in claim 16 including the step of mounting a main oil containment pan on the central area of the base; and placing the transformer in the containment pan.

18. The method defined in claim 16 including the steps of dead ending a plurality of incoming conductors on said one framework; and connecting said conductors to the disconnect switches.

19. The method defined in claim 18 including the step of extending a guy wire between the pair of spaced frameworks to distribute a portion of the dead end tension of the incoming conductors to the other of said frameworks.

20. The method defined in claim 17, including the step of erecting a platform of wood beams within the main oil containment pan; and mounting the transformer on said platform.

21. The method defined in claim 16 including the step of installing disconnect switches on the other of said frameworks; and installing conductors between said disconnect switches and the transformer.

22. The method defined in claim 21 including the step of mounting circuit breakers on the base adjacent the said other framework; and installing conductors between said circuit breakers and the disconnect switches.

23. The method defined in claim 22 including dead ending a plurality of outgoing conductors on the said other framework; and installing conductors connecting said outgoing conductors and the circuit breakers.

24. The method defined in claim 16 including the step of applying a layer of gravel on the prepared area before placing the base thereon.

25. The method defined in claim 16 including the steps of assembling the base at a site remote from the prepared area; and transporting the assembled base to the prepared site.

26. The method defined in claim 17 including the step of mounting an auxiliary oil containment tank adjacent the main oil containment pan and installing fluid lines between said main containment pan and tank for transfer of oil from the pan to the tank.

27. The method defined in claim 16 including the step of installing an underground exit conduit adjacent the other of said frameworks.

28. The method defined in claim 17 including the step of mounting an auxiliary oil containment pan on one of the longitudinal beams outwardly of the main oil containment pan.

29. The method defined in claim 28 including providing a drain opening in each of the main and auxiliary oil containment pans.

30. The method defined in claim 16 including mounting a base plate on the coplanar beams of the base to form a generally liquid tight chamber therebetween.

* * * * *